Aug. 31, 1943.  I. A. WEAVER ET AL  2,328,114
VIBRATION AMPLITUDE AND CENTER OF OSCILLATION INDICATOR
Filed Jan. 5, 1942   3 Sheets-Sheet 1
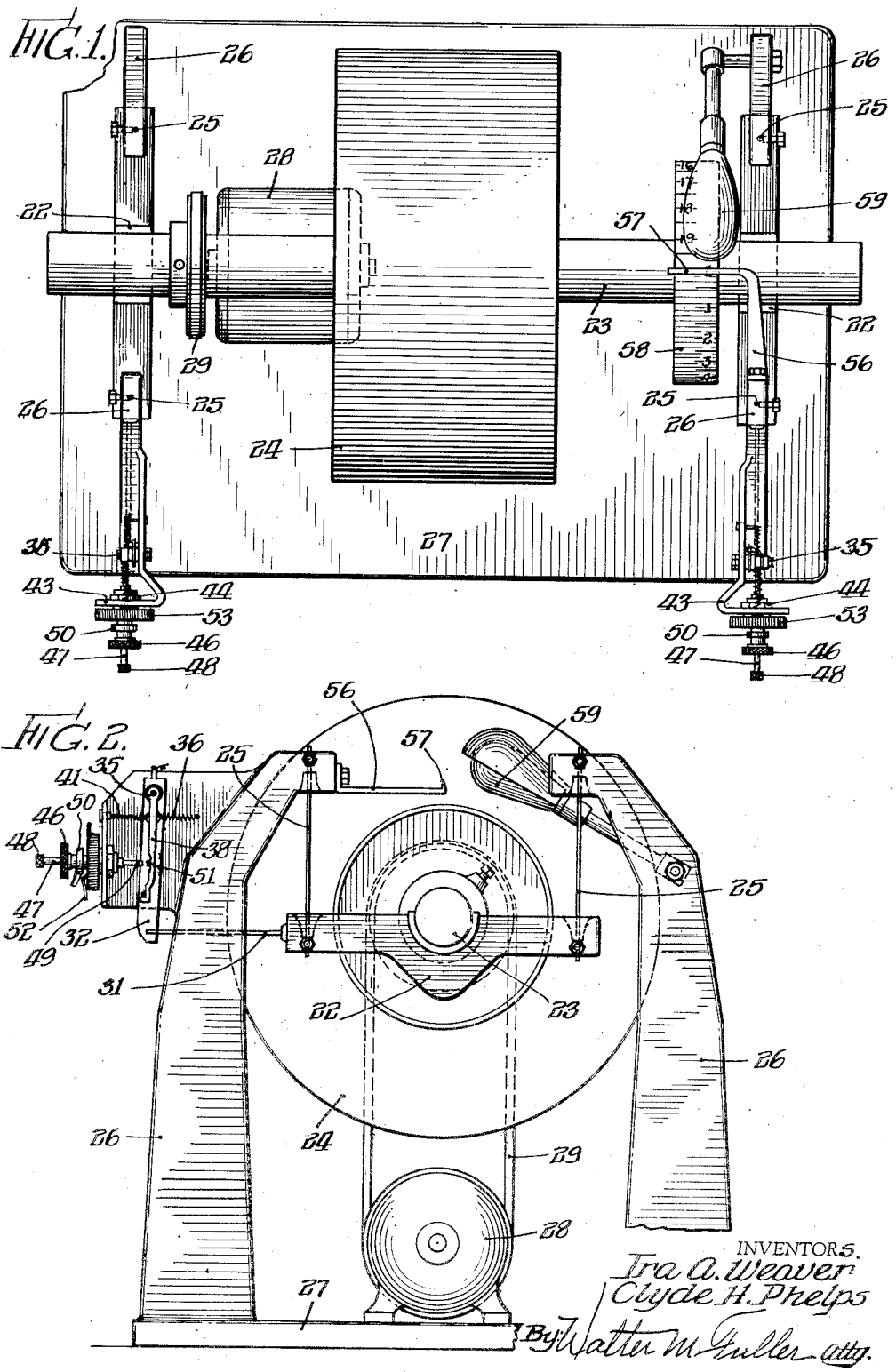
INVENTORS.
Ira A. Weaver
Clyde H. Phelps
By Walter M. Fuller atty.

Aug. 31, 1943.    I. A. WEAVER ET AL    2,328,114
VIBRATION AMPLITUDE AND CENTER OF OSCILLATION INDICATOR
Filed Jan. 5, 1942    3 Sheets-Sheet 2
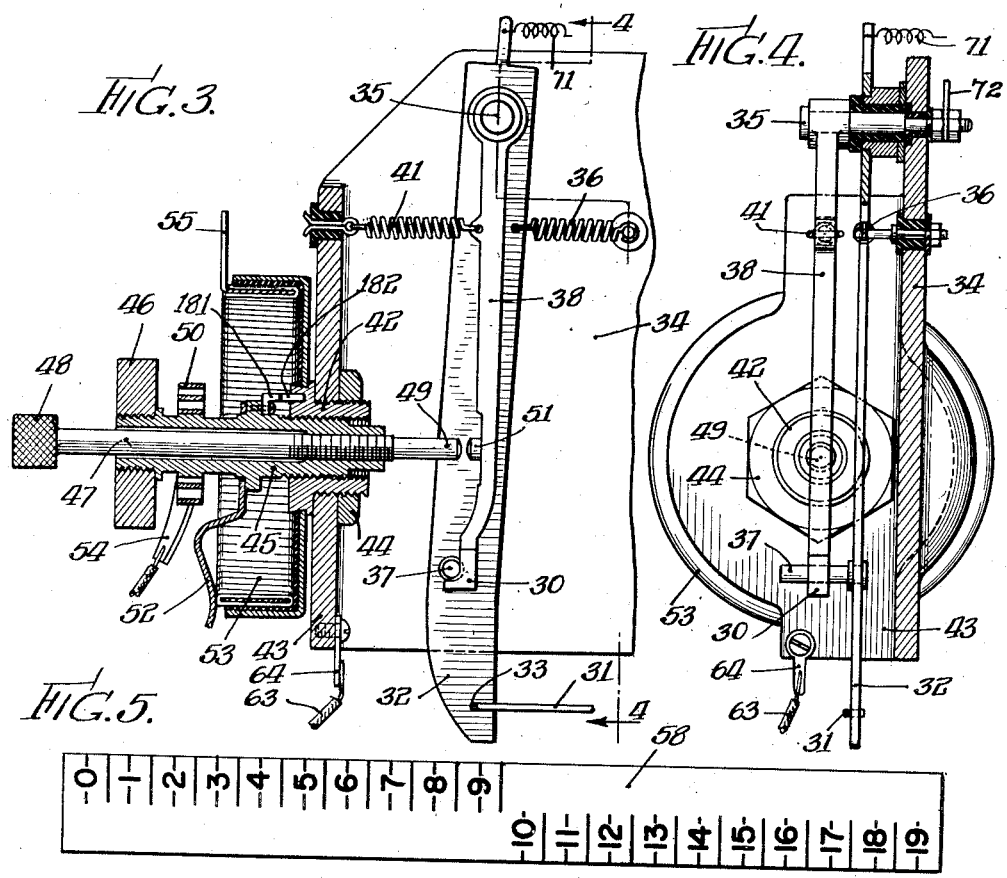
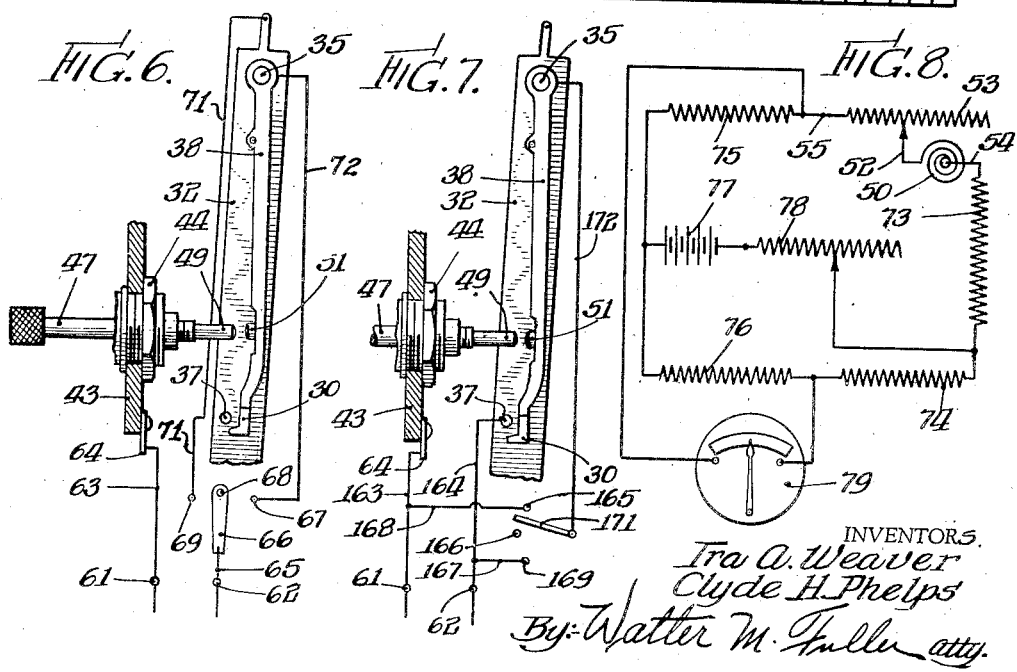
INVENTORS.
Ira A. Weaver
Clyde H. Phelps
By: Walter M. Fuller atty.

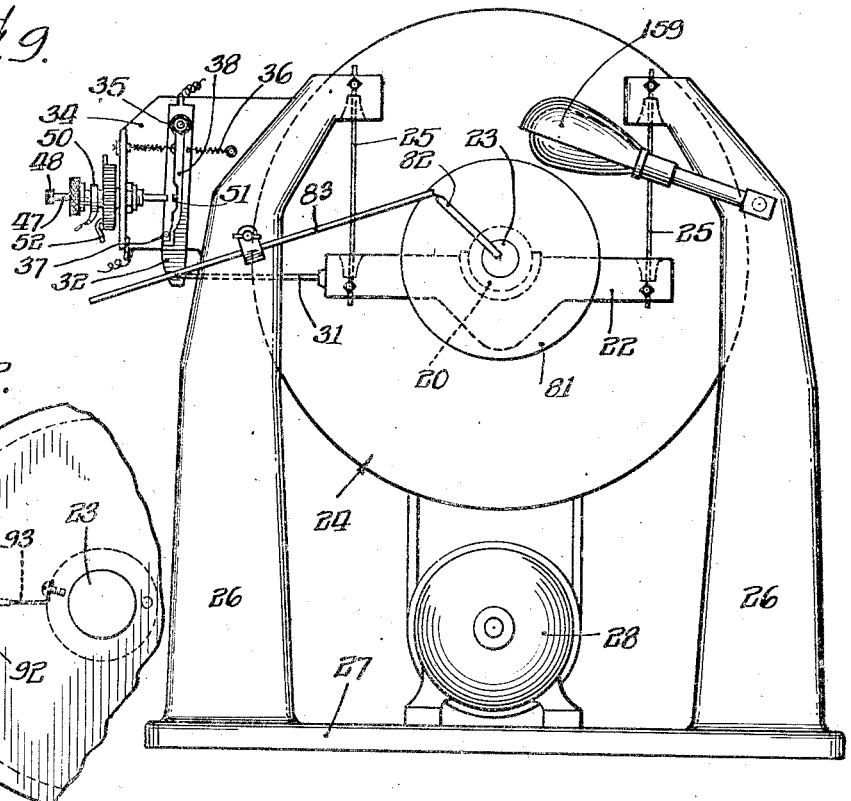

Patented Aug. 31, 1943

2,328,114

UNITED STATES PATENT OFFICE 2,328,114

VIBRATION AMPLITUDE AND CENTER OF OSCILLATION INDICATOR

Ira A. Weaver and Clyde H. Phelps, Springfield, Ill., assignors to Weaver Manufacturing Company, Springfield, Ill., a corporation of Illinois Application January 5, 1942, Serial No. 425,612

5 Claims. (Cl. 73—53)

This invention pertains to apparatus, including a combination of appropriate cooperating means, capable of denoting the amplitude of vibration of a rotating body and the angular-position of such vibration, when the body is mounted for rotation in, and is rotated in, a suitable supporting structure wherein there is, to some degree, freedom of oscillation of the revolving member so supported.

The means embodying the present invention is intended to be attached to, or connected with, balancing-machines designed to test for and to correct the unbalance existing in rotatable members and whereby the present invention will indicate the extent or degree of vibration and the center point or position of such vibration with respect, angularly, to the revolving member.

The prior art of balancing-machines includes many appliances, some of which are adapted to test and to permit the elimination of the unbalance in each of the two predetermined correction planes by methods which involve mechanism designed to substantially eradicate the effect of lack of balance in one correction plane upon that of the other.

The instant invention provides a simple and exact mechanism to indicate the amplitude of such vibration and the exact center thereof, which supplies means for calibrating by test, the precise value of remedial weight required to balance out such vibration, as well as indicating the angular-position or point of application of such correctional weight.

It is to be pointed out, however, that no means are provided by this invention for compensation or elimination of the effect of unbalance in one correction plane upon another, when a member is so mounted that this condition exists, but the present invention will accurately indicate the amplitude of vibration and the center point or position thereof at the point of attachment of this new device to any balancing-machine where such conditions exist, after which, by trial, calculation or additional correctional or compensating apparatus and through the indications of this invention, the proper correctional weight value and its true angular point of application may be determined.

The earlier art discloses methods and apparatus for determining the "high point" or point of maximum displacement of vibration of a rotating unbalanced member as indicative of the angular point of weight correction, but this "high point" will be at a new position for every different value of unbalance as well as for every different speed of rotation.

Inasmuch as the present invention provides means to indicate the exact center of vibration amplitude or oscillation, it supplies a means not affected by variation in speed of rotation or value of unbalance, the center position remaining constant while the maximum point, as specified above, is a variable with speed and weight.

The new appliance operating electrically is capable of use at high speeds, such that the members undergoing examination may be rotated at their normal operating speeds which may be considerably greater than the critical or resonant speed of the machine in which the test is conducted.

The novel apparatus of this invention includes a unique contact system which is substantially instantaneous in its operation of indicating the exact center position above referred to, and, by adjusting a contact screw assembly of the device, carrying a simple adjustable resistance unit, the exact amplitude of oscillation can be indicated in thousandths of an inch, highly magnified on the electric-meter employed, if desired, or indicated directly in weight-units from a test run, and as this indication is manually in operation, the meter shows the value after the rotation has stopped.

To enable those acquainted with this art to understand the invention in its various aspects and details, a present preferred embodiment of the same has been illustrated in the accompanying drawings, in which like reference numerals have been used to designate the same parts throughout the several views.

In these drawings—

Figure 1 is a plan view of the general structure;

Figure 2 is an end elevation of the same;

Figure 3 is an elevation and partial section through the variable contact device;

Figure 4 is a vertical section through such contact mechanism on line 4—4 of Figure 3;

Figure 5 illustrates the surface of the index-wheel as laid out flat;

Figure 6 shows one form of circuit connections for the contact-appliance;

Figure 7 presents another style of electric-circuit for the same;

Figure 8 portrays the Wheatstone-bridge circuit used;

Figures 9 and 10 illustrate another embodiment of the invention;

Figures 11 and 12 depict still a further design; and

Figure 13 shows another modified form of apparatus.

In these drawings, a conventional balancing-machine has been shown, such appliance including a pair of spaced-apart, aligned, open-top bearings 22, 22 for supporting the shaft 23 on which is mounted the body 24 to be tested for its balance or lack thereof, each such bearing 22 being supported from above by a pair of wires or straps 25, 25 (Figure 2) supported at their top ends on posts 26, 26 rising from a suitable base 27, such shaft 23 and its body 24 being rotated by an electric-motor 28 having a pulley-and-belt connection 29 with the shaft.

One such bearing 22 of the two, by means of a rod or link 31, is operatively connected to a substantially-upright rock-arm 32 hinged or rockingly associated therewith at 33, such arm being mounted, on a stationary extension 34 of one of the posts or standards 26, on a hinge-pin 35 from which it is suitably insulated and about the axis of which it will vibrate or oscillate in conformity and harmony with the vibratory movement of the body 24 undergoing test, this arm being yieldingly pulled in the direction toward shaft 23 by a coiled-spring 36 connected at one end to the arm 32 and at its opposite end to the stationary part 34.

Such arm 32 is provided with an outstanding electric-terminal in the form of a pin 37 with which the arm is in electrical connection, and a second arm 38, also hinged or rockingly supported on the hinge-pin 35 and insulated from arm 32 and also from such hinge-pin, is adapted through its own integral contact 30 to make electrical contact with the part 37, being pulled in that direction by a coiled-spring 41 fastened at one end to arm 38 and at its opposite end to a part of the fixed member 34.

An internally and externally screw-threaded headed sleeve or part 42 is fixedly mounted in an aperture through the wall 43, constituting a portion of the member 34, by a retaining-nut 44, and the screw-threaded passage through such sleeve accommodates a hollow screw 45 adjustable lengthwise in the sleeve by its knurled handle 46.

This screw 45 is internally screw-threaded, at least for a portion of its length, and engaging such thread thereof is an inner screw 47 turnable by its knob 48, one end of such screw 49 acting as a contact in alignment with a companion contact 51 forming part of rock-arm 38.

From what precedes, it should be clear that the metal, conductive member 38 has the two contacts 30 and 51 integral therewith, so that a portion of the arm constitutes an electrically-conductive bridge joining the two contacts.

Mounted on and rotatable with the manually-turnable lengthwise-adjustable, hollow screw 45 is the revoluble contact arm or rotor 52 of a circular rheostat 53 carried on, and the resistance-wire of which is insulated from, the stationary element 42, the electric-connection for such rotor comprising a spirally-wound, flexible, metallic strip 50 fastened at its inner end to the screw 45, its outer end forming a terminal 54 of the rheostat, the end of the resistance-wire of the rheostat having a companion terminal 55.

Mounted on one of the adjacent immovable standards 26 is a finger 56 (Figures 1 and 2) having a pointer or index end 57 directly over and in register with the axis of shaft 23 when the latter is not rotating, and directly beneath such pointer, the shaft has fixed thereto and rotatable therewith a round or circular wheel 58 displaying on its cylindrical periphery index or graduation marks, as shown in Figures 1 and 5, such marks being supplied with numerals from 0 to 9 inclusive along a semi-cylindrical portion of one edge section thereof and with numerals from 10 to 19 inclusive along the opposite edge portion of the remaining semi-circular part thereof.

An appropriately-shielded, stroboscopic electric-lamp 59 is so positioned on the frame of the machine that the light flashes issuing intermittently therefrom will adequately illuminate the circumference of the designated scale-member 58.

Figure 6 shows one style of electrical-system in which the described lamp may be used.

In such arrangement of parts, the two terminals of the lamp-circuit, including a source of electric-current, the remainder of which circuit need not be illustrated because it is well understood in the art, are designated 61 and 62, such terminal 61 being connected by a wire 63 to the frame part 43 through the terminal 64 (Figure 3) so that terminal 61 is in direct electrical association with screw 47 and its contact end 49.

The companion terminal 62 of the lamp-circuit is joined by wire 65 to the movable arm 66 of an electric-switch having three stationary complementary contacts 67, 68 and 69 with any one of which arm 66 may make connection, such contact 69 being connected to the backwardly and forwardly swinging arm 32 by wire 71, contact 67 being joined to the second arm 38 and its two contacts 51 and 30 by wire 72, the intermediate contact 68 being unconnected.

It will be apparent from the illustration of this organization, that when switch-arm 66 engages switch-contact 69, the two switches 49—51 and 37—30 will be in series relation, whereas, when such arm contacts with the switch-member 67, switch 37—30 will be electrically cut out but not mechanically and the switch 49—51 only will be electrically operative, so that the two switches may be employed in series combination or the single switch 49—51 may be used alone.

A somewhat modified or alternative circuit arrangement, in which either switch alone may be availed of, or the two switches employed in series may be utilized, is presented in Figure 7.

In this case, the lamp-circuit terminal 61 is directly connected by wire 163 to the contact 64 of part 43 and through these to screw 47 and its end terminal 49, and the complementary lamp-circuit terminal 62 is directly joined to arm 32 and its contact 37 by wire 164, while wire 172 connects arm 38 and its two contacts 51 and 30 with the movable switch-arm 171, the three stationary contacts of the switch being characterized 165, joined to wire 163 by connection 168; 166 not connected to anything; and 169 connected to wire 164 by connection 167.

Manifestly, when switch-arm 171 engages switch-contact 166, both switches 49—51 and 37—30 are operative and in series with one another; when arm 171 touches switch-contact 165, switch 49—51 is short-circuited and hence electrically inoperative with switch 37—30 in operation both electrically and mechanically; and when part 171 abuts switch-contact 169, switch 37—30 is out of action electrically but not mechanically, switch 49—51 alone being in operation.

Figure 8 portrays the Wheatstone-bridge electrical-system employed including the already-mentioned, variable resistance 53 as a part of one arm of the system, the remainder of such arm constituting a fixed resistance 73, the companion arm of the system being resistance 74, the resistances of the two other correlated arms being designated as 75 and 76.

As is fully illustrated in Figure 8 of the drawings, the usual battery or other suitable source of electric-current 77 and its participating adjustable resistance 78 are, as customary, connected in series relation across the bridge-circuit from between the resistances 75 and 76 to the connection between the resistances 73 and 74, and, as usual, the electric-galvanometer 79, or its equivalent, is joined to the system between the resistances 53 and 75 and between the resistances 74 and 76.

When the electric-current supplied by the battery is flowing through these resistances, the two 53 and 73 being considered as a variable one, and the several resistances are balanced, there is no potential difference imposed on the two terminals of the galvanometer and its needle remains stationary; on the other hand, however, if the resistance of the rheostat 53 is changed, the system becomes unbalanced, a current corresponding in strength to the resistance change flows through the galvanometer and its needle is correspondingly deflected to afford a comparable reading.

Assuming that the novel appliance of this invention is being actuated by rod 31, so that arm 32 is rocked forwardly and rearwardly in consonance with, and proportionately to, the vibratory movement of the rotating body 24 undergoing examination as to its balance and of its supporting members, it will be seen that, since arms 32 and 38, insulated from one another, are pivoted at the same point 35, they will be vibrated together as a unit, and, with screw 47 adjusted so that its contact end 49 will remain entirely out of contact with its companion oscillating contact 51, contact 39 will be constantly in physical and electrical engagement with the outstanding contact-pin 37 on arm 32, regardless of the oscillating movements of both arms.

By adjusting contact 49 by its screw 47 toward the pair of oscillating arms 32 and 38 sufficiently, contacts 49 and 51 could be caused to remain continuously in engagement with one another regardless of the swinging and rocking movement of arm 32, and contacts 37 and 39 would be constantly out of engagement with one another.

Clearly then a point of adjustment of contact 49 may be readily found such that there will be a substantially-simultaneous, practically-instantaneous closure of one pair of contacts and separation of the other pair of contacts caused by the oscillation of the arms.

Accordingly, if an electric-circuit, such as that of the stroboscopic-lamp, be connected to contacts 49 and 51 through contacts 37 and 39, there will be two substantially-instantaneous or momentary closures of the circuit for each cycle of oscillation, one very short closure when contact 49 engages contact 51 and the circuit is broken immediately at contacts 37 and 39, and another similar closure during the return part of the cycle and movement of the elements involved when contact is made between parts 39 and 37 and the circuit is broken instanter by contact 51 leaving contact 49.

With the circuit of the stroboscopic-lamp thus connected, the light will flash once for each such extremely-short closure of its circuit effected as described by the action of the two cooperating switches, and these intermittent light flashes will illuminate the graduations of the element 58 revolving with the rotating body under test, the light supplying two flashes for each revolution of such body, that is to say, two flashes for each complete cycle of oscillation caused by the unbalance of such body.

One such flash occurs when the revolving body passes the pointer 57 in one direction of its vibration and the other flash takes place as such body passes the pointer while the vibrating body is traveling in the opposite direction.

If, therefore, the contact 49 is adjusted by its screw so that the operator, during the two alternating sets of flashes, sees two numbers simultaneously side by side on the wheel 58, which are 10 units apart, as for example 7 and 17, that indicates that the center plane of oscillation or vibration of the body is that which passes through such two numbers, and this can be readily noted on the body undergoing test after its rotation has been stopped.

In this connection, it should be remembered that since the wheel or member 58 has 20 numerals around its 360° periphery thereof any two numerals thereon with a difference of 10 are necessarily 180° apart or directly opposite one another.

Thus the two flashes occur 180° apart, so far as the body examined is concerned, each taking place at the instant the center of vibration registers with the pointer.

Now by changing the electrical connections, as shown, in either Figure 6 or Figure 7, whichever is employed, by means of switch-arm 66 or 171, one flash can be terminated leaving the other flash in action to illuminate one only of the two numerals and this will indicate the angular position of the body when it is passing the center-of-vibration in one direction, such direction depending upon which flash has been selected to remain operative.

It is necessary to ascertain how much weight should be added to or subtracted from the body to balance it and that is accomplished in the following manner:

While the parts are rotating and the one set of flashes are illuminating the single index, as for example 7, the operator adjusts the outer or external screw 45 by its knurled knob 46 and thereby simultaneously and equally adjusts the inner screw 47 and its contact 49 until he sees the next number 6 or 8 at the pointer 57 by means of the series of intermittent light flashes.

Such numeral 6 or 8 thus presented to view shows that the rotating body has been revolved 18° from the central point of vibration and the extent of turning the screw is proportional to the part of the vibratory movement of the body necessary to effect this change in numerals seen and is commensurate with the total amplitude of vibration of the body which, at the speed of rotation employed, is proportionate to the unbalance in the body.

As will be readily understood, such turning of the screw 45 and switch-contact 49 causes the rheostat rotor-arm 52 to vary the resistance of the rheostat proportionally to the adjustment travel of the contact, that is proportional to the amount of vibration travel during 18° of rotation of the unbalanced body, and the galvanometer-needle is correspondingly influenced to afford a comparable reading.

Therefore, with the known pitch of the screw-thread of screw 45 and the known electrical resistance measuring circuit already described, the galvanometer may be calibrated in exact linear indications of the amplitude of oscillation or it may be calibrated in other suitable units, such as the weight of correctional material for addition to or removal from the unbalanced body undergoing examination.

With the various data supplied by the tests presented above, the body may be easily modified to render it suitably balanced.

Obviously, instead of making the contact adjustment such as to display the next single numeral of the graduated-scale, it may be moved to cause a showing of some other number, provided the galvanometer-graduations are made to correspond to such change of procedure.

In order to hold screw 45 in normal or neutral position with the rheostat contact-arm 52 in its unoperated relation a stop 181 on the screw may engage a fixed stop 182 on member 42 to limit turning of the screw in one direction.

For the ascertainment of the center of oscillation of the unbalanced rotating body, other alternative structures may be employed, in which instances the graduated-wheel 58 is not needed.

One such substitute structure is presented in Figures 9 and 10 and it includes a disc 81 mounted on a reduced-diameter end portion of shaft 23 to revolve with the body 24 undergoing test, such disc having a visible, radially-disposed arrow 82 on its outer face reaching from the center of the disc to or approximately to its periphery.

A rockably-mounted, lengthwise-shiftable, manually-adjustable pointer 83 mounted on a stationary part of the appliance is of such extent that its active end can be brought to, and maintained at, any position adjacent to any portion of the periphery of the disc.

The stroboscopic-lamp 159 is located so that it will illuminate the arrow-equipped, outer surface of the disc, the lamp otherwise operating as hereinabove fully set forth.

As in the previous instance, the contact-adjusting screw 47 is turned until alternate flashes of the lamp show the successive illuminations of the arrow in direct alignment with one another, that is as a single straight line, extended across the full diameter of the disc which assures that at those two instants the body 24 is passing its center-of-vibration in its two opposite directions of travel.

After the operator views such double-length, rectilinear line, composed of the two arrow images, he, as indicated above, terminates one series of such light flashes so that he then perceives but a single-length arrow, whereupon he adjusts the pointer angularly and lengthwise to have its end coincide with the outer end of such arrow.

Then when the rotation of the parts is stopped, and they are turned to bring the outer end of the arrow into register with the operative end of the pointer, it will be known that the angular position of the body when passing through the center-of-oscillation in one direction is that indicated by the arrow and pointer.

A different structure, without the lamp, may be used as shown in Figures 11 and 12 in which case the disc 84, instead of disc 81, is used on the end of the shaft 23, such round member being of insulating-material having a narrow, conductive collector-ring 85 mounted on its back face, a conductive, pointed terminal 86 (Figure 11) mounted on an insulation-block 87 on the bearing-member 22 being close to ring 85 and providing a short spark-gap between itself and the ring, a wire 88 being connected to such terminal 86 and another wire 90 being joined directly to the metal part 22.

Disc 84 has a radial aperture 89 through it and in, or in register with, this space are two terminals 91 and 92 spaced apart to afford a spark-gap between them, such terminal 91 being electrically connected to the collector-ring 85 and the companion terminal 92 being electrically connected by a wire 93 to shaft 23 and through the latter and member 22 to wire 90.

Thus this construction comprises a portion of an electric-circuit between conductors 88 and 90, including two spark-gaps in series relation.

Assuming that such partial, two-gap circuit is substituted for the lamp, during each revolution of the shaft and its unbalanced body subjected to test, the operator facing the disc will see two series of sparks and by adjustment of screw 47 and its contact 49, he can cause such sparks to occur 180° apart so that the two series of radial sparks will appear to be in alignment with one another.

Then by changing the electric-circuit so that only one such series of sparks is seen, the operator manually adjusts pointer 83 to bring it into register with such sparks, and thereafter, after the rotation has ceased, the shaft and body are turned to register the spark-gap with the end of the pointer, with a comparable result as indicated above with respect to arrow 82.

Instead of the use of a spark-gap for this purpose, a glow-tube 94, such as a neon-tube, may be used in a somewhat-longer, radial window 95 in a disc 96, the construction and mode of operation being otherwise as indicated above, in connection with the spark-gap.

As will be readily understood, full round discs are not essential, single radial arms being capable of employment in their stead in that the greater portions of the discs perform no useful function.

We claim:

1. In an appliance, for use with a balance-testing machine including means to support the body to be tested in a manner permitting its rotation about its axis and having freedom of movement in both lateral and longitudinal horizontal directions by reason of its unbalance, and means to rotate said body about its axis, said appliance having index-means including an electric light-flash means, an electric-circuit adapted to be supplied with electric-current and including said light-flash means, electric-switch means in said circuit, and means actuated by the vibration of said rotating body operating said electric-switch means and thereby governing said light-flashes, the novel combination of features being that said electric-switch means comprises two electric-switches in series relation in said circuit, in combination with (a) means to adjust the action of said switches so that when the rotating body passes its center-of-oscillation in one direction, one said switch closes said circuit and the second switch immediately opens the circuit, such action producing a light-flash, and when the body passes said center-of-oscillation in the opposite direction, said second switch closes said circuit and said first switch immediately opens the circuit, said action producing a light-flash at 180° difference in rotation of the body from said first flash, (b) means to eliminate one set of said light-flashes, and (c) a pointer adapted to cooperate with said index-means, said pointer and said index-means being adjustable relatively to one another.

2. The novel combination of features set forth in claim 1, including the additional features that said index-means includes a round member rotatable with said body and having on its periphery two sets of indices, one set extending around 180° of such periphery and the other set around the remaining 180° of such periphery, and that said electric light-flash means is a stroboscopic-light in said electric-circuit illuminating said indices intermittently, said pointer cooperating with said indices, whereby the center-of oscillation of the body undergoing test is indicated when two of said indices 180° apart are viewed seemingly-simultaneously at the pointer by the operator.

3. The novel combination of features as set forth in claim 1, including the additional novel features that said index-means includes a disc rotatable with said body and displaying a radial mark, and that said electric light-flash means is a stroboscopic-light in said electric-circuit intermittently illuminating said mark during its rotation, whereby the center-of-oscillation of the body undergoing test is indicated when the operator sees such mark on opposite sides of the axis of rotation and as of straight double length, the adjustment of said pointer permitting it to be brought into register with said mark during its rotation while illuminated by one set of said light-flashes.

4. The novel combination of features as set forth in claim 1, including the additional novel features that said index-means includes a member rotatable with said body and that said electric light-flash means in said electric-circuit is mounted on said member radial to the axis of rotation of said body and member, whereby the center-of-oscillation of said body is indicated when the operator during the double series of light-flashes sees the light-flash means at two positions directly opposite one another on opposite sides of said axis, the adjustment of said pointer permitting it to be brought into register with said electric light-flash means during the rotation of the latter while illuminated by one set of said light-flashes.

5. In an appliance, for use with a balance-testing machine including means to support the body to be tested in a manner permitting its rotation about its axis and with freedom of movement in both lateral and longitudinal horizontal directions by reason of its unbalance, and means to rotate said body about its axis, said appliance having index-means including an electric light-flash means, an electric-circuit adapted to be supplied with electric-current and including said light-flash means, electric-switch means in said circuit, and means, actuated by the vibration of said rotating body, operating said electric-switch means and thereby governing said light-flashes, the novel combination of features being (a) that said electric-switch means comprises two electric-switches in series relation in said circuit, (b) that said index-means includes a round member rotatable with said body and having on its periphery two sets of indices, one set extending around 180° of such periphery and the other set around the remaining 180° of such periphery, (c) that said electric light-flash means is a stroboscopic-lamp in said electric-circuit producing said light-flashes illuminating said sets of indices intermittently, (d) means to adjust the acton of said electric-switches so that when the rotating body passes its center-of-oscillation in one direction, one said switch closes said circuit and the second switch immediately opens the circuit, such action producing a light-flash by said stroboscopic-lamp, and when the body passes said center-of-oscillation in the opposite direction, said second switch closes said circuit and said first switch immediately opens the circuit, such action producing a light-flash at 180° difference in rotation of the body from said first flash, (e) means to eliminate one set of said light-flashes, (f) a pointer adapted to cooperate with said sets of indices, (g) means to adjust the action of said electric-switches when one set only of said indices is illuminated by said light-flashes to change their operation so that another index of such set is illuminated, and (h) an indicator operated in proportion to the extent of movement of said adjusting means set forth in (g), whereby said indicator shows the equivalent of the vibration-amplitude of the body undergoing test.

IRA A. WEAVER.
CLYDE H. PHELPS.